United States Patent
Tan et al.

(10) Patent No.: US 7,465,497 B2
(45) Date of Patent: Dec. 16, 2008

(54) HIGH DIELECTRIC CONSTANT NANOCOMPOSITES, METHODS OF MANUFACTURE THEREOF, AND ARTICLES COMPRISING THE SAME

(75) Inventors: Qi Tan, Rexford, NY (US); Patricia Chapman Irwin, Altamont, NY (US); Yang Cao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 239 days.

(21) Appl. No.: 11/286,096

(22) Filed: Nov. 23, 2005

(65) Prior Publication Data

US 2007/0117886 A1 May 24, 2007

(51) Int. Cl.
B32B 5/16 (2006.01)
B05D 7/00 (2006.01)

(52) U.S. Cl. .............. 428/403; 428/323; 428/328; 428/331; 428/407; 427/212; 977/778

(58) Field of Classification Search ............... 428/403, 428/323, 328, 331; 427/212
See application file for complete search history.

(56) References Cited

U.S. PATENT DOCUMENTS

| | | | |
|---|---|---|---|
| 5,650,031 A | | 7/1997 | Bolon et al. |
| 6,599,631 B2 * | | 7/2003 | Kambe et al. ............ 428/447 |
| 6,630,234 B1 * | | 10/2003 | Tanisho et al. ........... 428/323 |
| 6,632,109 B2 | | 10/2003 | Irwin et al. |
| 6,645,517 B2 * | | 11/2003 | West et al. ............... 424/422 |
| 6,778,053 B1 | | 8/2004 | Irwin et al. |
| 6,864,306 B2 | | 3/2005 | Rao et al. |
| 7,052,777 B2 * | | 5/2006 | Brotzman et al. ........ 428/570 |
| 7,108,915 B2 * | | 9/2006 | Adams et al. ............ 428/403 |
| 7,171,811 B1 * | | 2/2007 | Berchowitz et al. ....... 60/525 |
| 7,274,458 B2 * | | 9/2007 | Perez et al. .............. 356/445 |
| 7,291,394 B2 * | | 11/2007 | Winkler et al. ........... 428/403 |
| 2003/0017351 A1 | | 1/2003 | Hayashi et al. |
| 2004/0265551 A1 | | 12/2004 | Takaya et al. |
| 2005/0080175 A1 | | 4/2005 | Paik et al. |
| 2005/0161149 A1 | | 7/2005 | Yokota et al. |
| 2006/0167139 A1 * | | 7/2006 | Nelson et al. ............ 523/212 |

OTHER PUBLICATIONS

JP58141222. Publication Date Aug. 22, 1983. "High-Dielectric Film". (Abstract Only).

(Continued)

Primary Examiner—H. T Le
(74) Attorney, Agent, or Firm—Ann M. Agosti (57) ABSTRACT

Disclosed herein is a composition comprising thermoplastic polymers; and nanoparticles; wherein the nanoparticles comprise a substrate upon which is disposed a coating composition; and wherein the substrate has a different dielectric constant from that of the coating composition. Disclosed herein too is a composition comprising a polymeric material; and nanoparticles; wherein the nanoparticles comprise a substrate upon which is disposed a coating composition comprising a plurality of layers; and wherein at least one layer has a dielectric constant that is different from the remaining layers. Disclosed herein too is a method comprising blending a polymeric resin with nanoparticles to form a composition; wherein the nanoparticles comprise a substrate upon which is disposed a coating composition comprising a plurality of layers; and wherein at least one layer has a dielectric constant that is different from the remaining layers.

37 Claims, 2 Drawing Sheets

OTHER PUBLICATIONS

Colin Kydd Campbell. "Experimental and Theoretical Characterization of an Antiferroelectric Ceramic Capacitor for Power Electronics". IEEE Transactions on Components and Packaging Technologies, vol. 25, No. 2, pp. 211-216, Jun. 2002.

Jianwen Xu and C.P. Wong[a]. "Low-loss percolative dielectric composite" Applied Physics Letters 87, 082907, pp. 082907-1,2,3, 2005.

Y. Bai, Z.-Y. Cheng, V. Gharti, H.S. Xu, and Q.M. Zhang[a]. "High-dielectric-constant ceramic-powder polymer composites" Applied Physics Letters, vol. 76, No. 25, pp. 3804-3806, published Apr. 28, 2000.

E. Aulagner, J. Guillet, G. Seytre, C. Hantouche, P. Le Gonidec, G. Terzulli. "(PVDF/BatiO$_3$) and (PP/BaTiO$_3$) Films for Energy Storage Capacitors" 1995 IEEE 5th International Conference on Conduction and Breakdown in Solid Dielectrics. pp. 423-427. 1995.

D. Dimos. "Perovskite Thin Films for High-Frequency Capacitor Applications[1]". Annual Review of Materials Science. vol. 28: 397-419 (Volume publication date Aug. 1998).

* cited by examiner

- ♦ Self passivated Al
- ■ Oxidized Al

FIG. 4

HIGH DIELECTRIC CONSTANT NANOCOMPOSITES, METHODS OF MANUFACTURE THEREOF, AND ARTICLES COMPRISING THE SAME

BACKGROUND

This disclosure relates to high dielectric constant nanocomposites, methods of manufacture thereof, and articles comprising the same.

It is desirable in commercial applications, such as spark plug caps for automobiles, to have a high dielectric constant and high breakdown voltage. Spark plug caps are generally manufactured from polymeric composites. High dielectric constants in polymeric composites are generally achieved by using large volume fractions of fillers. This however, reduces mechanical properties such as impact strength and ductility in the spark plug cap.

It is also desirable for energy storage devices, such as DC-link capacitors, that are utilized in high energy density power conversion applications to withstand the high voltage and high temperature environments of electrical devices such as motors and generators. It is therefore desirable for such storage devices to display a high breakdown voltage and corona resistance. In the electronics industry, it is also desirable to have a suitable high dielectric constant material that satisfies the electrical, reliability, and processing requirements for incorporating capacitors into a printed wiring board.

In the electronics industry as well as in the automotive industry, there is therefore a need for new polymeric composites having a high dielectric constant and a high breakdown strength as well as good mechanical strength and processability. It is therefore desirable to have a composition that combines a high dielectric constant with ease of processing as well as with improved mechanical properties over currently existing high dielectric constant composites.

SUMMARY

Disclosed herein is a composition comprising thermoplastic polymers; and nanoparticles; wherein the nanoparticles comprise a substrate upon which is disposed a coating composition; and wherein the substrate has a different dielectric constant from that of the coating composition.

Disclosed herein too is a composition comprising a polymeric material; and nanoparticles; wherein the nanoparticles comprise a substrate upon which is disposed a coating composition comprising a plurality of layers; and wherein at least one layer has a dielectric constant that is different from the remaining layers.

Disclosed herein too is a method comprising blending a polymeric resin with nanoparticles to form a composition; wherein the nanoparticles comprise a substrate upon which is disposed a coating composition comprising a plurality of layers; and wherein at least one layer has a dielectric constant that is different from the remaining layers.

DETAILED DESCRIPTION

It is to be noted that the terms "first", "second", and the like as used herein do not denote any order, quantity, or importance, but rather are used to distinguish one element from another. The terms "a" and "an" do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

Disclosed herein are compositions comprising a polymeric material and nanoparticles that comprise a substrate upon which is disposed a coating composition that has a dielectric constant that is different from that of the substrate. Disclosed herein too are compositions comprising a polymeric material and nanoparticles that comprise a substrate upon which is disposed a coating composition comprising a plurality of layers wherein at least one layer has a different dielectric constant from the other layers in the nanoparticle. Disclosed herein too are compositions comprising a polymeric material and nanoparticles that comprise a metal substrate upon which is disposed a coating composition comprising a single layer or a plurality of layers. When the metallic substrate has disposed upon it a plurality of layers, it is desirable for at least one layer to have a different dielectric constant from the other layers in the nanoparticle. In one embodiment, the layers are arranged upon the substrate such that the innermost layer has the highest dielectric constant of all the layers while the outermost layer has the lowest dielectric constant. In one embodiment, each layer has a lower dielectric constant than the dielectric constant of the preceding inner layer. In other words, each layer has a lower dielectric constant than the dielectric constant of an inner layer that is closer to the center of the nanoparticle.

In one embodiment, the nanoparticles comprise an inorganic oxide and/or a ceramic substrate having a dielectric constant that is greater than that of the coating composition disposed upon the substrate. The coating composition facilitates compatibility between the nanoparticles and the polymeric material, which permits dispersion of the nanoparticles within the polymeric material. In one embodiment, the polymeric material comprises polymers that have a glass transition temperature of greater than or equal to about 100° C.

The composition comprising a polymeric material and the nanoparticles have a higher dielectric constant relative to the polymeric material alone while maintaining a breakdown resistance of greater than or equal to about 200 Volts/micrometer.

The polymeric material used in the compositions may be selected from a wide variety of thermoplastic polymers, thermosetting polymers, blends of thermoplastic polymers, or blends of thermoplastic polymers with thermosetting polymers. The polymeric material can comprise a homopolymer, a copolymer such as a star block copolymer, a graft copolymer, an alternating block copolymer or a random copolymer, ionomer, dendrimer, or a combination comprising at least one of the foregoing. The polymeric material may also be a blend of polymers, copolymers, terpolymers, or the like, or a combination comprising at least one of the foregoing.

Examples of thermoplastic polymers that can be used in the polymeric material include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination comprising at least one of the foregoing thermoplastic polymers.

Exemplary polymers include polyetherimides, polyphenylene ethers, polyethylene terephthalates, polyethylenes, polypropylenes, polyimides, polyvinylidene fluorides, or a combination comprising at least one of the foregoing polymers. An exemplary polymer is ULTEM®, a polyetherimide, commercially available from General Electric Plastics (GE Plastics).

Examples of blends of thermoplastic polymers include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, or the like, or a combination comprising at least one of the foregoing.

Examples of thermosetting polymers that can be blended with the thermoplastic polymers are resins of epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene (DCPD) resin, reactive polyamides, or the like, or a combination comprising at least one of the foregoing.

In one embodiment, suitable thermosetting polymers that can be blended with the thermoplastic polymers include thermosetting polymers that can be made from an energy activatable thermosetting pre-polymer composition. Examples include polyurethanes such as urethane polyesters, silicone polymers, phenolic polymers, amino polymers, epoxy polymers, bismaleimides, polyimides, and furan polymers. The energy activatable thermosetting pre-polymer component can comprise a polymer precursor and a curing agent. The polymer precursor can be heat activatable, eliminating the need for a catalyst. The curing agent selected will not only determine the type of energy source needed to form the thermosetting polymer, but may also influence the resulting properties of the thermosetting polymer. Examples of curing agents include aliphatic amines, aromatic amines, acid anhydrides, or the like, or a combination comprising at least one of the foregoing. The energy activatable thermosetting pre-polymer composition may include a solvent or processing aid to lower the viscosity of the composition for ease of extrusion including higher throughputs and lower temperatures. The solvent could help retard the crosslinking reaction and could partially or totally evaporate during or after polymerization.

As noted above, it is desirable for the polymeric material to have a glass transition temperature of greater than or equal to about 100° C. In one embodiment, it is desirable for the polymeric material to have a glass transition temperature of greater than or equal to about 175° C. In another embodiment, it is desirable for the polymeric material to have a glass transition temperature of greater than or equal to about 210° C. In yet another embodiment, it is desirable for the polymeric material to have a glass transition temperature of greater than or equal to about 245° C. In yet another embodiment, it is desirable for the polymeric material to have a glass transition temperature of greater than or equal to about 290° C.

In one embodiment, the polymeric material is used in an amount of about 5 to about 99.999 wt % of the total weight of the composition. In another embodiment, the polymeric material is used in an amount of about 10 wt % to about 99.99 wt % of the total weight of the composition. In another embodiment, the polymeric material is used in an amount of about 30 wt % to about 99.5 wt % of the total weight of the composition. In another embodiment, the polymeric material is used in an amount of about 50 wt % to about 99.3 wt % of the total weight of the composition.

As noted above, the particles can comprise a substrate with a coating composition disposed thereon. The coating composition can comprise a single layer or a plurality of layers with progressively decreasing dielectric constants from the innermost layer to the outermost layer. The innermost layer of the coating composition has the highest dielectric constant while each subsequent outer layer has a lower dielectric constant than the preceding inner layer.

Examples of materials suitable for use as the substrate include metals, ceramics, borides, carbides, silicates, chalcogenides, hydroxides, metal oxides, nitrides, perovskites and perovskites derivatives, phosphides, sulfides, and silicides, semiconductors such as silicon, silicon carbide or the like, or a combination comprising at least one of the foregoing.

Suitable metals include transition, lanthanide, actinide, alkali, alkaline earth metals, or the like, or a combination comprising at least one of the foregoing. Exemplary metals include aluminum, copper, iron, nickel, palladium, silver, titanium, or the like, or a combination comprising at least one of the foregoing metals.

Exemplary borides include aluminum boride, titanium boride, or the like, or a combination comprising at least one of the foregoing borides. Exemplary carbides include silicon carbide, titanium carbide, tungsten carbide, iron carbide, or the like, or a combination comprising at least one of the foregoing carbides. Exemplary chalcogenides include bismuth telluride, bismuth selenide, or the like, or a combination comprising at least one of the foregoing chalcogenides. Exemplary nitrides include silicon nitride, boron nitride, titanium nitride, aluminum nitride, molybdenum nitride, vanadium nitride, or the like, or a combination comprising at least one of the foregoing nitrides.

Silicates that may be used as substrates or coatings include metal silicates wherein the metals are from Group 2A of the Periodic Table, i.e., berrylium (Be), magnesium (Mg), calcium (Ca), strontium (Sr), barium (Ba) and radium (Ra). Preferred metal silicates include $Mg_2SiO_4$, $CaSiO_3$, $BaSiO_3$ and $SrSiO_3$. In addition to Group 2A metals, the present metal silicates may include metals from Group 1A, i.e., lithium (Li), sodium (Na), potassium (K), rubidium (Rb), cesium (Cs) and francium (Fr). For example, metal silicates may include sodium silicates such as $Na_2SiO_3$ and $NaSiO_3$-$5H_2O$, lithium silicates such as $LiAlSiO_4$, $Li2SiO_3$ and $Li_4SiO_4$. Additional metal silicates may include $Al_2Si_2O_7$, $ZrSiO_4$, $KAlSi_3O_8$, $NaAlSi_3O_8$, $CaAl_2Si_2O_8$, $CaMgSi_2O_6$, $BaTiSi_3O_9$, $Zn_2SiO_4$ or a combination comprising at least one of the foregoing silicates.

Exemplary hydroxides include aluminum hydroxide, calcium hydroxide, barium hydroxide, or the like, or a combination comprising at least one of the foregoing hydroxides.

Exemplary oxides include zirconates, titanates, aluminates, stannates, niobates, tantalates and rare earth oxides. Exemplary inorganic oxides include silica, aluminum oxide, silicon dioxide, calcium oxide, cerium oxide, copper oxide, titanium oxide, zinc oxide, zirconium oxide, tantalum oxide, niobium oxide, yttrium oxide, magnesium oxide, $Mg_2SiO_4$, MgO, $CaTiO_3$, $MgZrSrTiO_6$, $MgTiO_3$, $MgAl_2O_4$, $WO_3$, $SnTiO_4$, $ZrTiO_4$, $CaSiO_3$, $CaSnO_3$, $CaWO_4$, $CaZrO_3$, $MgTa_2O_6$, $MgZrO_3$, $MnO_2$, PbO, $Bi_2O_3$ and $La_2O_3$, $CaZrO_3$, $BaZrO_3$, $SrZrO_3$, $BaSnO_3$, $CaSnO_3$, $MgSnO_3$, $Bi_2O_3/2SnO_2$, $Nd_2O_3$, $Pr_7O_{11}$, $Yb_2O_3$, $Ho_2O_3$, $La_2O_3$, $MgNb_2O_6$, $SrNb_2O_6$, $BaNb_2O_6$, $MgTa_2O_6$, $BaTa_2O_6$, $Ta_2O_3$, or the like, or a combination comprising at least one of the foregoing oxides. Exemplary metal oxides include $Mg_2SiO_4$, MgO, $CaTiO_3$, $MgZrSrTiO_6$, $MgTiO_3$, $MgAl_2O_4$, $MgTa_2O_6$, $MgZrO_3$, or the like, or a combination comprising at least one of the foregoing inorganic oxides.

Exemplary perovskites and perovskite derivatives include barium titanate ($BaTiO_3$), strontium titanate ($SrTiO_3$) barium strontium titanate, strontium-doped lanthanum manganate, lanthanum aluminum oxides ($LaAlO_3$), lanthanum strontium copper oxides (LSCO), yttrium barium copper oxides ($YBa_2Cu_3O_7$), lead zirconate titanate, lanthanum-modified lead zirconate titanate, or the like, combinations of lead magnesium niobate-lead titanate, or a combination comprising at least one of the foregoing perovskites and perovskite derivatives. Perovskites that exemplify the giant dielectric phenomenon such as, for example, calcium-copper-titanium-oxides (CCTOs) having the formula (I) can also be included:

$$ACu_3Ti_4O_{12} \tag{I}$$

where A is calcium (Ca) or cadmium (Cd).

In another embodiment, perovskites having the formula (II) can be included:

$$A'_{2/3}Cu_3Ti_3FeO_{12} \tag{II}$$

where A' is bismuth (Bi), yttrium (Y).

In yet another embodiment, perovskites termed lithium and titanium co-doped nickel oxide (LTNOs) having the general formula (III) can be included:

$$Li_xTi_yNi_{1-x-y}O \tag{III}$$

where x is less than or equal to about 0.3 and y is less than or equal to about 0.1.

Exemplary phosphides include nickel phosphide, vanadium phosphide, or the like, or a combination comprising at least one of the foregoing phosphides. Exemplary silicides include molybdenum silicide. Exemplary sulfides include molybdenum sulfide, titanium sulfide, tungsten sulfide, or the like, or a combination comprising at least one of the foregoing sulfides.

The substrates have at least one dimension in the nanometer range. It is generally desirable for the substrates to have an average largest dimension that is less than or equal to about 500 nm. The dimension may be a diameter, edge of a face, length, or the like. The substrates may have shapes whose dimensionalities are defined by integers, e.g., the inorganic oxide substrates are either 1, 2 or 3- dimensional in shape. They may also have shapes whose dimensionalities are not defined by integers (e.g., they may exist in the form of fractals). The substrates may exist in the form of spheres, flakes, fibers, whiskers, or the like, or a combination comprising at least one of the foregoing forms. These substrates may have cross-sectional geometries that may be circular, ellipsoidal, triangular, rectangular, polygonal, or a combination comprising at least one of the foregoing geometries. The substrates, as commercially available, may exist in the form of aggregates or agglomerates prior to incorporation into the polymeric material or even after incorporation into the polymeric material. An aggregate comprises more than one substrate in physical contact with one another, while an agglomerate comprises more than one aggregate in physical contact with one another.

The substrates are added in amounts of about 0.05 to about 50 wt % of the total weight of the nanoparticles. In one embodiment, the substrates are added in amounts of about 0.1 to about 30 wt % of the total weight of the nanoparticles. In another embodiment, the substrates are added in amounts of about 1 to about 25 wt % of the total weight of the nanoparticles. In yet another embodiment, the substrates are added in amounts of about 3 to about 20 wt % of the total weight of the nanoparticles.

Commercially available examples of nanosized inorganic oxide substrates are NANOACTIVE™ calcium oxide, NANOACTIVE™ calcium oxide plus, NANOACTIVE™ cerium oxide, NANOACTIVE™ magnesium oxide, NANO-ACTIVE™ magnesium oxide plus, NANOACTIVE™ titanium oxide, NANOACTIVE™ zinc oxide, NANOACTIVE™ silicon oxide, NANOACTIVE™ copper oxide, NANOACTIVE™ aluminum oxide, NANOACTIVE™ aluminum oxide plus, all commercially available from NanoScale Materials Incorporated. A commercially available example of nanosized nitride is BORONID™ boron nitride, available from ESK.

The coating composition can be disposed upon the substrate in one or more layers. When the coating composition is disposed upon the substrate in one or more layers, at least one layer has a different dielectric constant from that of the other layers or that of the substrate when the substrate is non-metallic. In one embodiment, some of the layers may have a dielectric constant that is similar to that of other layers, but have a different chemical composition. In an exemplary embodiment, it is desirable for the coating composition to comprise a single layer or a plurality of layers with progressively decreasing dielectric constants from the innermost layer to the outermost layer. The innermost layer of the coating composition has the highest dielectric constant while each subsequent outer layer has a lower dielectric constant than the preceding inner layer.

The coating composition can comprise some of the aforementioned materials that are used to form the substrate. For example, the nanoparticle can comprise an aluminum metal substrate coated with an aluminum oxide layer. In another example, the nanoparticle can comprise a titanium oxide substrate upon which is disposed an inner layer of aluminum oxide and an outer layer of silicon dioxide. In yet another example, the nanoparticle can comprise a strontium-doped titanium oxide substrate upon which is disposed a boron nitride layer. An example of a suitable nanoparticle comprising a plurality of layers with decreasing dielectric constants is a barium titanate substrate having a dielectric constant k=3000 coated with the following layers from inside to outside in the following order: lanthanum-modified PZT (k=1000)-PZT(k=500)-SrTiO.sub.3(k=250)-TiO.sub.2 (k=104)-Al.sub.2O.sub.-3(k=9.6)- SiO.sub.2(k=3.9).

In one embodiment, each layer of the coating composition can have a thickness of less than or equal to about ten nanometers. In another embodiment, each layer of the coating composition can have a thickness of less than or equal to about five nanometers. In yet another embodiment, each layer of the coating composition can have a thickness of less than or equal to about two nanometers. The deposition of the coating composition on the substrates may be carried out in a solution or directly in the presence of the components that are used to form the coating composition. When the deposition is carried out in a solution, an appropriate solvent may be used. In one method of coating the substrates, the substrates can be optionally heated to a suitable temperature in a mixer such as for example an Eirich mixer, following which a solution comprising the coating composition or reactive precursors to the coating composition is added to the mixer. The substrates are mixed in the presence of the solution for a time period effective to uniformly coat the substrates. The temperature may be raised or lowered during the process of mixing to facilitate the coating. Following coating, the nanoparticles are dried to remove any unreacted precursors and also to remove any solvents that may be present. The dried particles may be subjected to a sintering step in order to further react the reactive precursors of the coating composition.

In one embodiment, the coated particle may be subjected to a second coating process to coat the nanoparticle with a second layer having a composition similar to that of the first layer. In another embodiment, the coated particle may be subjected to a second coating process to coat the nanoparticle with a second layer having a different composition from that of the first layer.

In yet another embodiment, directed to the development of the nanoparticles, a substrate comprising a metal is oxidized, carbonized or nitrided to form a ceramic layer upon the substrate. The process is sometimes referred to as passivation of a metal surface. In an exemplary embodiment, a substrate comprising aluminum is oxidized to form a layer of aluminum oxide upon the aluminum. The nanoparticles comprising the aluminum oxide coating disposed upon the aluminum substrate are then dispersed into a polymeric material to form the composition.

In yet another embodiment, the substrate can be coated with the coating composition by processes such as chemical vapor deposition (CVD), atomic layer deposition (ALD), expanding thermal plasma (ETP), ion plating, plasma enhanced chemical vapor deposition (PECVD), metal organic chemical vapor deposition (MOCVD) (also called Organometallic Chemical Vapor Deposition (OMCVD)), metal organic vapor phase epitaxy (MOVPE), physical vapor deposition processes such as sputtering, reactive electron beam (e-beam) deposition, and plasma spray.

In one embodiment, the nanoparticles can optionally be surface treated to facilitate bonding or adhesion with the polymeric material. In one embodiment, the surface treatment comprises coating the nanoparticles with a silane-coupling agent. Examples of suitable silane-coupling agents include tetramethylchlorosilane, hexadimethylenedisilazane, gamma-aminopropoxysilane, or the like, or a combination comprising at least one of the foregoing silane coupling agents. The silane-coupling agents generally enhance compatibility of the nanoparticles with the polymeric material and improve dispersion of the nanoparticles within the polymeric material.

As noted above, the nanoparticles have at least one dimension in the nanometer range. It is generally desirable for the nanoparticles to have an average largest dimension that is less than or equal to about 1,000 nm. The dimension may be a diameter, edge of a face, length, or the like. In one embodiment, the shape and geometry of the nanoparticles can be the same as that of the substrate. In another embodiment, the shape and geometry of the nanoparticles can be different from that of the substrate.

The nanoparticles may have shapes whose dimensionalities are defined by integers, e.g., the inorganic oxide nanoparticles are either 1, 2 or 3-dimensional in shape. They may also have shapes whose dimensionalities are not defined by integers (e.g., they may exist in the form of fractals). The nanoparticles may exist in the form of spheres, flakes, fibers, whiskers, or the like, or a combination comprising at least one of the foregoing forms. These nanoparticles may have cross-sectional geometries that may be circular, ellipsoidal, triangular, rectangular, polygonal, or a combination comprising at least one of the foregoing geometries. The nanoparticles, as commercially available, may exist in the form of aggregates or agglomerates prior to incorporation into the polymeric material or even after incorporation into the polymeric material. An aggregate comprises more than one nanoparticle in physical contact with one another, while an agglomerate comprises more than one aggregate in physical contact with one another.

Regardless of the exact size, shape and composition of the nanoparticles, they may be dispersed into the polymeric material at loadings of about 0.0001 to about 50 wt % of the total weight of the composition when desired. In one embodiment, the nanoparticles are present in an amount of greater than or equal to about 1 wt % of the total weight of the composition. In another embodiment, the nanoparticles are present in an amount of greater than or equal to about 1.5 wt % of the total weight of the composition. In another embodiment, the nanoparticles are present in an amount of greater than or equal to about 2 wt % of the total weight of the composition. In one embodiment, the nanoparticles are present in an amount of less than or equal to 40 wt % of the total weight of the composition. In another embodiment, the nanoparticles are present in an amount of less than or equal to about 30 wt % of the total weight of the composition. In another embodiment, the nanoparticles are present in an amount of less than or equal to about 25 wt % of the total weight of the composition.

The polymeric material together with the nanoparticles and any other optionally desired fillers may generally be processed in several different ways such as, but not limited to melt blending, solution blending, or the like, or a combination comprising at least one of the foregoing methods of blending. Melt blending of the composition involves the use of shear force, extensional force, compressive force, ultrasonic energy, electromagnetic energy, thermal energy or a combination comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or a combination comprising at least one of the foregoing.

Melt blending involving the aforementioned forces may be conducted in machines such as, but not limited to, single or multiple screw extruders, Buss kneader, Henschel, helicones, Ross mixer, Banbury, roll mills, molding machines such as injection molding machines, vacuum forming machines, blow molding machine, or the like, or a combination comprising at least one of the foregoing machines. It is generally desirable during melt or solution blending of the composition to impart a specific energy of about 0.01 to about 10 kilowatt-hour/kilogram (kwhr/kg) of the composition. Within this range, a specific energy of greater than or equal to about 0.05, preferably greater than or equal to about 0.08, and more preferably greater than or equal to about 0.09 kwhr/kg is generally desirable for blending the composition. Also desirable is an amount of specific energy less than or equal to about 9, preferably less than or equal to about 8, and more preferably less than or equal to about 7 kwhr/kg for blending the composition.

In one embodiment, the polymeric material in powder form, pellet form, sheet form, or the like, may be first dry blended with the nanoparticles and other optional fillers if desired in a Henschel or a roll mill, prior to being fed into a melt blending device such as an extruder or Buss kneader. In another embodiment, the nanoparticles are introduced into the melt blending device in the form of a masterbatch. In such a process, the masterbatch may be introduced into the melt blending device downstream of the polymeric material.

When a masterbatch is used, the nanoparticles may be present in the masterbatch in an amount of about 20 to about 50 wt %, of the total weight of the masterbatch. In one embodiment, the nanoparticles are used in an amount of greater than or equal to about 22.5 wt % of the total weight of the masterbatch. In another embodiment, the nanoparticles are used in an amount of greater or equal to about 25 wt %, of the total weight of the masterbatch. In another embodiment, the nanoparticles are used in an amount of greater than or equal to about 30 wt %, of the total weight of the masterbatch. In one embodiment, the nanoparticles are used in an amount of less than or equal to about 45 wt %, of the total weight of the masterbatch. In another embodiment, the nanoparticles are used in an amount of less than or equal to about 40 wt %, of the total weight of the masterbatch. In another embodiment, the nanoparticles are used in an amount of less than or equal to about 35 wt %, of the total weight of the masterbatch. Examples of polymeric materials that may be used in masterbatches are polypropylene, polyetherimides, polyamides, polyesters, or the like, or a combination comprising at least one of the foregoing polymeric materials.

In another embodiment relating to the use of masterbatches in polymeric blends, it is sometimes desirable to have the masterbatch comprising a polymeric material that is the same as the polymeric material that forms the continuous phase of the composition. In yet another embodiment relating to the use of masterbatches in polymeric blends, it may be desirable to have the masterbatch comprising a polymeric material that is different in chemistry from the other polymers that are used in the composition. In this case, the polymeric material of the masterbatch will form the continuous phase in the blend.

The composition comprising the polymeric material and the nanoparticles may be subjected to multiple blending and forming steps if desirable. For example, the composition may be extruded and formed into pellets. The pellets may be fed into a molding machine where it may be formed into other desirable shapes. Alternatively, the composition emanating from a single melt blender may be formed into sheets or strands and subjected to post-extrusion processes such as annealing, uniaxial or biaxial orientation.

Solution blending may also be used to manufacture the composition. The solution blending may also use additional energy such as shear, compression, ultrasonic vibration, or the like to promote homogenization of the nanoparticles with the polymeric material. In one embodiment, a polymeric material suspended in a fluid may be introduced into an ultrasonic sonicator along with the nanoparticles. The mixture may be solution blended by sonication for a time period effective to disperse the nanoparticles within the polymeric material. The polymeric material along with the nanoparticles may then be dried, extruded and molded if desired. It is generally desirable for the fluid to swell the polymeric material during the process of sonication. Swelling the polymeric material generally improves the ability of the nanoparticles to impregnate the polymeric material during the solution blending process and consequently improves dispersion.

In another embodiment related to solution blending, the nanoparticles are sonicated together with polymeric material precursors. Polymeric material precursors are generally monomers, dimers, trimers, or the like, which can be reacted into polymeric materials. A fluid such as a solvent may optionally be introduced into the sonicator with the nanoparticles and the polymeric material precursor. The time period for the sonication is generally an amount effective to promote encapsulation of the nanoparticles by the polymeric material precursor. After the encapsulation, the polymeric material precursor is then polymerized to form a polymeric material within which is dispersed the nanoparticles.

Suitable examples of monomers that may be used to facilitate this method of encapsulation and dispersion are those used in the synthesis of polymers such as, but not limited to polyacetals, polyacrylics, polycarbonates, polystyrenes, polyesters, polyamides, polyamideimides, polyarylates, polyurethanes, polyarylsulfones, polyethersulfones, polyarylene sulfides, polyvinyl chlorides, polysulfones, polyetherimides, polytetrafluoroethylenes, polyetherketones, polyether etherketones, or the like, or a combination comprising at least one of the foregoing. In one embodiment, the mixture of polymeric material, polymeric material precursor, fluid and/or the nanoparticles is sonicated for a period of about 1 minute to about 24 hours. In another embodiment, the mixture is sonicated for a period of greater than or equal to about 5 minutes. In another embodiment, the mixture is sonicated for a period of greater than or equal to about 10 minutes. In another embodiment, the mixture is sonicated for a period of greater than or equal to about 15 minutes. In one embodiment, the mixture is sonicated for a period of less than or equal to about 15 hours. In another embodiment, the mixture is sonicated for a period of less than or equal to about 10 hours. In another embodiment, the mixture is sonicated for a period of and more preferably less than or equal to about 5 hours.

Solvents may be used in the solution blending of the composition. The solvent may be used as a viscosity modifier, or to facilitate the dispersion and/or suspension of nanoparticles. Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone, or the like, or a combination comprising at least one of the foregoing solvents may be used. Polar protic solvents such as water, methanol, acetonitrile, nitromethane, ethanol, propanol, isopropanol, butanol, or the like, or a combination comprising at least one of the foregoing polar protic solvents may be used. Other non-polar solvents such benzene, toluene, methylene chloride, carbon tetrachloride, hexane, diethyl ether, tetrahydrofuran, or the like, or a combination comprising at least one of the foregoing solvents may also be used if desired. Co-solvents comprising at least one aprotic polar solvent and at least one non-polar solvent may also be used. In one embodiment, the solvent is xylene or N-methylpyrrolidone.

If a solvent is used, it may be utilized in an amount of about 1 to about 50 wt %, of the total weight of the composition. In one embodiment, if a solvent is used, it may be utilized in an amount of about 3 to about 30 wt %, of the total weight of the composition. In yet another embodiment, if a solvent is used, it may be utilized in an amount of about 5 to about 20 wt %, of the total weight of the composition. It is generally desirable to evaporate the solvent before, during and/or after the blending of the composition.

Blending can be assisted using various secondary species such as dispersants, binders, modifiers, detergents, and additives. Secondary species may also be added to enhance one or more of the properties of the composition. Blending can also be assisted by pre-coating the nanoparticles with a thin layer of the polymeric material or with a phase that is compatible with the polymeric material, such as, for example a silane layer.

A composition comprising a polymeric material and nanoparticles has advantages over the polymeric material alone or other commercially available compositions that comprise a polymeric material and particles having particle sizes in the micrometer range. In one embodiment, the composition has a dielectric constant that is at least 10% greater than a composition comprising polymeric material alone. In another embodiment, the composition has a dielectric constant that is at least 50% greater than the polymeric material alone. In another embodiment, the composition has a dielectric constant that is at least 100% greater than the polymeric material alone.

The composition also has a breakdown voltage that is advantageously greater than the polymeric material alone or other commercially available compositions that comprise a polymeric material and particles having particle sizes in the micrometer range. In one embodiment, the composition has a breakdown voltage that is at least 150 Volts/micrometer (V/micrometer). The breakdown voltage is generally determined in terms of the thickness of the composition. In another embodiment, the composition has a breakdown voltage that is at least 300 V/micrometer. In another embodiment, the composition has a breakdown voltage that is at least 400 V/micrometer.

The composition also has a corona resistance that is advantageously greater than the polymeric material alone or other commercially available compositions that comprise a polymeric material and particles having particle sizes in the micrometer range. In one embodiment, the composition has a corona resistance that is resistant to a current of about 1000 volts to 5000 volts applied for about 200 hours to about 2000 hours. In another embodiment, the composition has a corona resistance that is resistant to a current of about 1000 volts to 5000 volts applied for about 250 hours to about 1000 hours. In yet another embodiment, the composition has a corona resistance that is resistant to a current of about 1000 volts to 5000 volts applied for about 500 hours to about 900 hours.

The composition has a dielectric constant greater than or equal to about 3 when measured at frequencies of about 100 to about $10^5$ hertz (Hz). In one embodiment, the composition has a dielectric constant greater than or equal to about 5 when measured at frequencies of about 100 to about $10^5$ Hz. In yet another embodiment, the composition has a dielectric constant greater than or equal to about 10 when measured at frequencies of about 100 to about $10^5$ Hz. In yet another embodiment, the composition has a dielectric constant greater than or equal to about 50 when measured at frequencies of about 100 to about $10^5$ Hz.

In another embodiment, the composition also has an impact strength of greater than or equal to about 5 kiloJoules per square meter ($kJ/m^2$). In another embodiment, the composition has an impact strength of greater than or equal to about 10 $kJ/m^2$. In another embodiment, the composition has an impact strength of greater than or equal to about 15 $kJ/m^2$. In another embodiment, the composition has an impact strength of greater than or equal to about 20 $kJ/m^2$.

Compositions that comprise the nanoparticles may also be optically transparent. In one embodiment, the compositions have a transmissivity to visible light of greater than or equal to about 70%. In another embodiment, the compositions have a transmissivity to visible light of greater than or equal to about 80%. In yet another embodiment, the compositions have a transmissivity to visible light of greater than or equal to about 90%. In yet another embodiment, the compositions have a transmissivity to visible light of greater than or equal to about 95%.

In yet another embodiment, the composition also has a Class A surface finish when molded. Molded articles can be manufactured by injection molding, blow molding, compression molding, or the like, or a combination comprising at least one of the foregoing.

The composition can advantageously be used in spark plug caps, capacitors, defibrillators, printed wiring boards, or other articles.

The following examples, which are meant to be exemplary, not limiting, illustrate compositions and methods of manufacturing of some of the various embodiments of the compositions and the methods of manufacture described herein.

EXAMPLES

Example 1

This example was performed to demonstrate the increase in the dielectric constant of a composition when substrates coated with a coating composition were dispersed in a polymeric material. Titanium oxide ($TiO_2$) particles coated with a layer of aluminum oxide ($AL_2O_3$) were purchased from ALD NanoSolutions Inc. The aluminum oxide layers are less than 10 nm and do not contain any aluminum oxide that is in the alpha phase.

The coated particles had an average particle size of 30 nanometers. The coated particles were compounded into ULTEM® polymer (a polyetherimide commercially available from General Electric Corporation) at 3 parts per hundred (phr) and 31 parts per hundred relative to ULTEM® polymer to form the nanocomposite. The ULTEM® was added to a solvent in an amount of 16 wt %, based on the total weight of the solution of ULTEM® and the solvent. The solvent used for the solution casting was n-methylpyrrolidone (NMP). The nanocomposite was then dissolved in a solvent and cast on a glass substrate to form a film. The measurements of dielectric constant were performed at room temperature at a frequency range of 100 to $10^5$ Hz using dielectric analyzer model HP4285A commercially available from Hewlett Packard Corporation.

Figure 1:
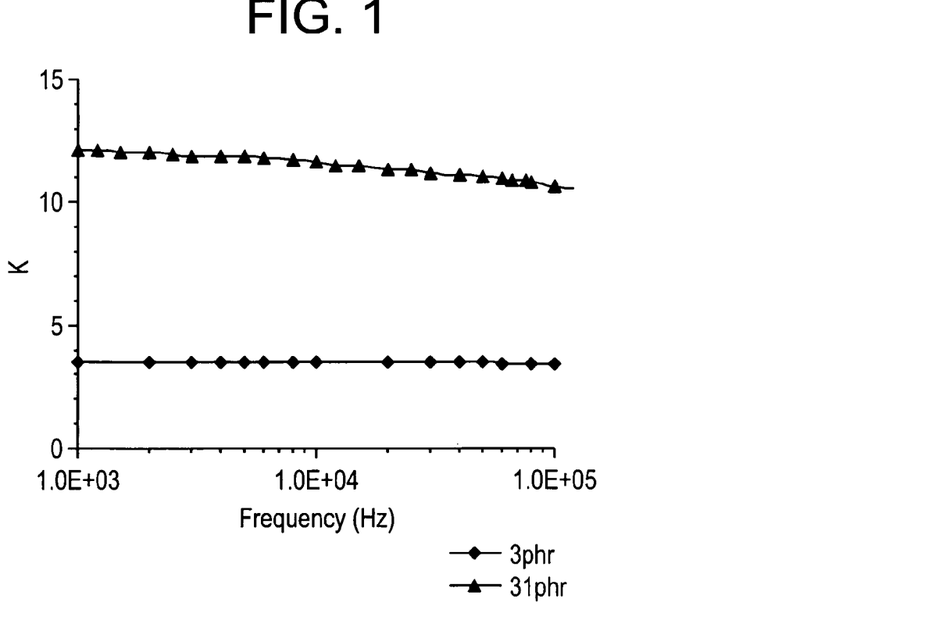
FIG. 1 is a graphical representation of the increase in dielectric constant when alumina-coated titanium oxide nanoparticles are incorporated into ULTEM®.

The film thickness after casting and drying was 20 to 150 microns, which was sputter coated with platinum. The platinum contacts the electrodes of the dielectric analyzer. FIG. 1 shows a graph of the dielectric constant of the nanocomposite film. The dielectric constant increased from 3 to above 3.5 with the addition of 3 phr of titania particles coated with alumina. For the sample containing 31 wt % of titania particles coated with alumina, the dielectric constant is increased from 3 to about 12 at a frequency of 1,000 Hz. This represents an increase of at least 400% in the dielectric constant.

The dielectric breakdown strength of the nanocomposite film containing 3 phr of titania particles coated with alumina was similar to that of the ULTEM® polymer alone and was determined to be about 300 kilovolt/millimeter (kV/mm). Higher filler loading decreases the breakdown strength.

In order to evaluate the breakdown strength, the sample was immersed in silicon oil and a direct-current (DC) voltage was applied using a high voltage supply. A sphere-plane setup was used for the breakdown measurements. The diameter of the sphere was ¼ inch (6.25 millimeters). The spherical electrode was connected to a high potential whereas the plane electrode was connected to ground potential. The test was performed at room temperature using a stepwise voltage. Each voltage step was 500 V/second before the next higher voltage was applied. The process proceeded until breakdown occurred. Breakdown is generally believed to occur when the sample shows a sharp current increase. Breakdown strength was calculated as the electrical voltage divided by the sample thickness.

Example 2

Figure 4:
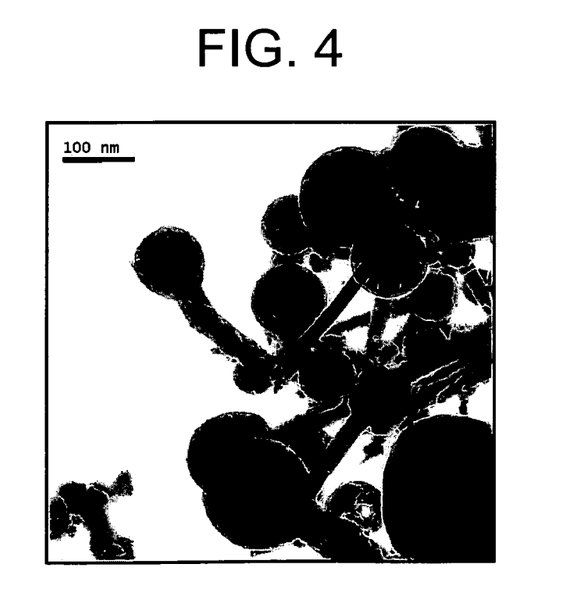
FIG. 4 shows the particle images after passivation.

This example was performed to demonstrate the increase in the dielectric constant when aluminum substrates that were passivated with a layer of alumina were dispersed in a polymeric material comprising ULTEM®. The passivation of aluminum particles was completed in two different ways. In one method, the nanosized aluminum powder is oxidized by exposure to air at room temperature. The second way consisted of oxidizing the aluminum powder in air at 600° C. for half an hour. These particles are either passivated with a thin layer of aluminum oxide (when exposed to air at room temperature) or alternatively completely oxidized (for smaller particles exposed to air at 600° C.) as shown in FIG. 4.

Figure 2:
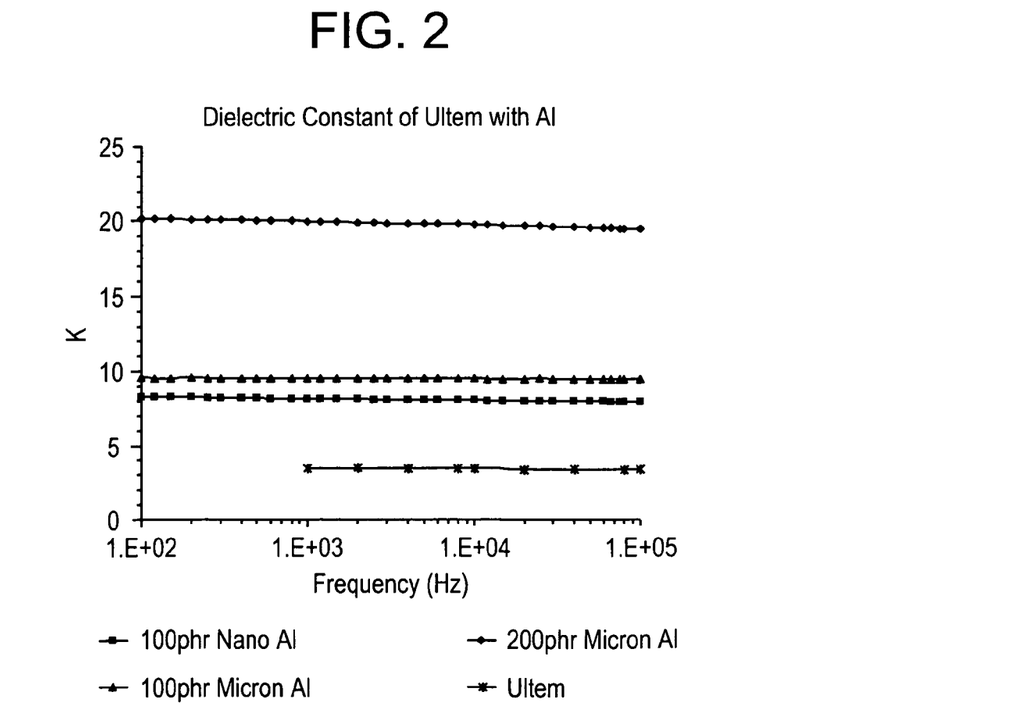
FIG. 2 is a graphical representation showing the increase in dielectric constant when alumina-coated titanium oxide nanoparticles are incorporated into ULTEM®.

100 parts of the passivated aluminum was added to one hundred parts of Ultem.RTM. resin. The passivated aluminum was added in the form of nanoparticles or micrometer-sized particles. The nanoparticles have an average particle size of 50 nanometers. The micrometer-sized particles have an average particle size of 3 micrometers. The film was prepared in the same manner as described in Example 1. Dielectric measurements made at frequencies of about 100 to about 10,000 Hz are plotted in FIG. 2. From FIG. 2 it can be seen that the addition of 100 phr of passivated aluminum nanoparticles increases the dielectric constant of ULTEM.RTM. from 3.2 to 9.5. From the figure it can also be seen that the addition of nanoparticles increases the dielectric constant of the nano-composite over the value obtained if the particles have average particle sizes in the micrometer range. In addition, it can be seen that the addition of aluminum particles in an amount of 200 phr can increase the dielectric constant of the composition up to 20.

Figure 3:
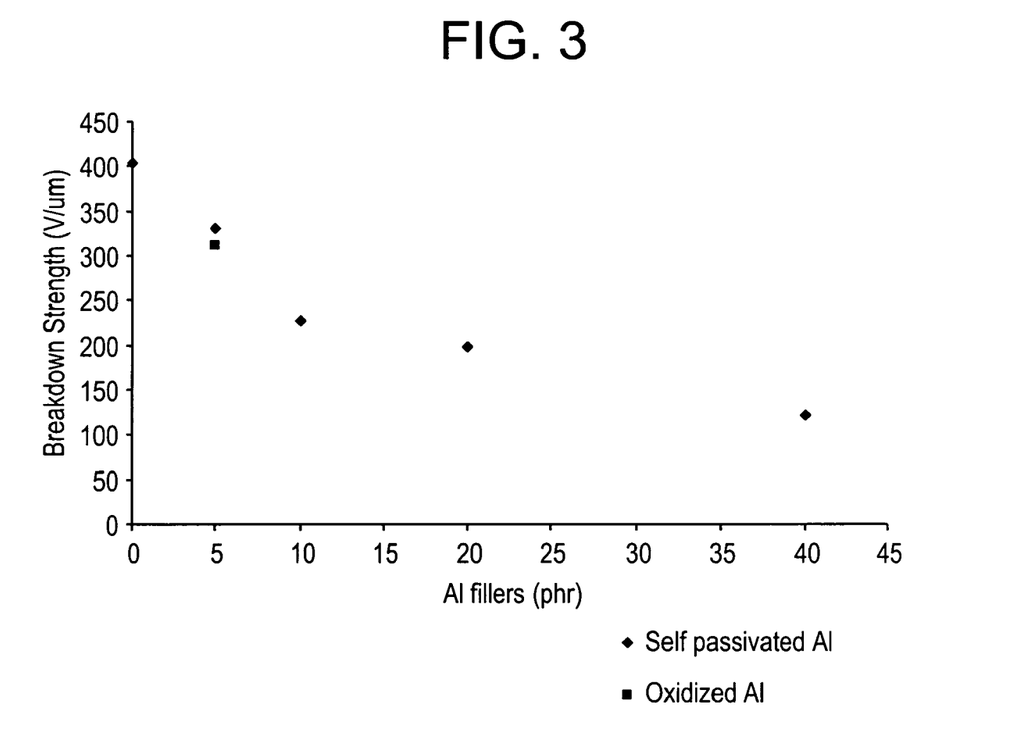
FIG. 3 is a graphical representation showing the decrease in breakdown strength with the increase in nanoparticle concentration in ULTEM®.

FIG. 3 shows the breakdown strength for self passivated particles and oxidized particles dispersed in ULTEM.RTM.. From this plot it can be seen that as the weight percent of the particles is increased the breakdown strength decreases. This is because the metal particles have high electrical conductivity. Even when they are protected with a thin layer of oxide, the electron mobility still contributes to electron tunneling through under the high voltages of the test. However, from FIGS. 2 and 3 it can be seen that at a 10 wt % loading of the nanoparticles, the dielectric constant is increased while the breakdown strength is still at about 200 volts per micrometer. The composition can advantageously be used in capacitors, defibrillators, printed wiring boards, spark plug caps, components for spark plugs, or other articles.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
    a thermoplastic polymer, wherein the thermoplastic polymer has a glass transition temperature greater than or equal to about 100° C.; and
    nanoparticles; wherein the nanoparticles comprise a substrate upon which is disposed a coating composition; wherein the substrate has a different dielectric constant from that of the coating composition; and
    wherein the composition has a breakdown resistance of greater than or equal to about 200 volts/micrometer.

2. The composition of claim 1, wherein the coating composition comprises one or more layers.

3. The composition of claim 2, wherein a dielectric constant of an innermost layer is greater than a dielectric constant of an outermost layer.

4. The composition of claim 1, wherein each layer has a lower dielectric constant than a dielectric constant of a preceding inner layer that is closer to the center of the nanoparticle.

5. The composition of claim 1, wherein the substrate has a higher dielectric constant than the dielectric constant of the coating composition.

6. The composition of claim 1, wherein the coating composition comprises a plurality of layers with progressively decreasing dielectric constants from an innermost layer to an outermost layer.

7. The composition of claim 1, wherein the substrate comprises metals, ceramics, borides, carbides, silicates, chalcogenides, hydroxides, metals, metal oxides, nitrides, perovskites and perovskites derivatives, phosphides, sulfides, silicides, or a combination comprising at least one of the foregoing.

8. The composition of claim 1, wherein the coating composition comprises ceramics, borides, carbides, silicates, chalcogenides, hydroxides, metals, metal oxides, nitrides, perovskites and perovskites derivatives, phosphides, sulfides, suicides, or a combination comprising at least one of the foregoing.

9. The composition of claim 8, wherein the metal oxides comprise zirconates, titanates, aluminates, silicates, stannates, niobates, tantalates, rare earth oxides or a combination comprising at least one of the foregoing metal oxides.

10. The composition of claim 8, wherein the perovskites comprise calcium-copper-titanium-oxides having the formula (I):

$$ACu_3Ti_4O_{12} \tag{I}$$

where A is calcium or cadmium.

11. The composition of claim 8, wherein the perovskites have the formula (II):

$$A'_{2/3}Cu_3Ti_3FeO_{12} \tag{II}$$

where A' is bismuth or yttrium.

12. The composition of claim 8, wherein the perovskites are lithium and titanium co-doped nickel oxide (LTNOs) having the general formula (III):

$$Li_xTi_yNi_{1-x-y}O \tag{III}$$

where x is less than or equal to about 0.3 and y is less than or equal to about 0.1.

13. The composition of claim 1, wherein the thermoplastic polymer has a glass transition temperature of greater than or equal to about 150° C.

14. The composition of claim 1, wherein the thermoplastic polymer comprises polyetherimides, polyphenylene ethers, polyethylene terephthalates, polyethylenes, polypropylenes, polyimides, polyvinylidene fluorides, or a combination comprising at least one of the foregoing polymers.

15. An article comprising the composition of claim 1.

16. The article of claim 15, wherein the article is a capacitor or a component for a spark plug.

17. A composition comprising:
a polymeric material; wherein the polymeric material has a glass transition temperature greater than or equal to about 100° C.; and
nanoparticles; wherein the nanoparticles comprise a substrate upon which is disposed a coating composition comprising a plurality of layers; wherein at least one layer has a dielectric constant that is different from the remaining layers; and
wherein the composition has a breakdown resistance of greater than or equal to about 200 volts/micrometer.

18. The composition of claim 17, wherein a dielectric constant of an innermost layer is greater than a dielectric constant of an outermost layer.

19. The composition of claim 17, wherein each layer has a lower dielectric constant than a dielectric constant of a preceding inner layer that is closer to the center of the nanoparticle.

20. The composition of claim 17, wherein the substrate has a higher dielectric constant than the dielectric constant of the coating composition.

21. The composition of claim 17, wherein the plurality of layers have a progressively decreasing dielectric constant from an innermost layer to an outermost layer.

22. The composition of claim 17, wherein the substrate comprises metals, ceramics, borides, carbides, silicates, chalcogenides, hydroxides, metals, metal oxides, nitrides, perovskites and perovskites derivatives, phosphides, sulfides, silicides, or a combination comprising at least one of the foregoing.

23. The composition of claim 22, wherein the metal oxides comprise zirconates, titanates, aluminates, silicates, stannates, niobates, tantalates, rare earth oxides or a combination comprising at least one of the foregoing metal oxides.

24. The composition of claim 22, wherein the perovskites comprise calcium-copper-titanium-oxides having the formula (I):

$$ACu_3Ti_4O_{12} \tag{I}$$

where A is calcium or cadmium.

25. The composition of claim 22, wherein the perovskites have the formula (II):

$$A'_{2/3}Cu_3Ti_3FeO_{12} \tag{II}$$

where A' is bismuth or yttrium.

26. The composition of claim 22, wherein the perovskites are lithium and titanium co-doped nickel oxide (LTNOs) having the general formula (III):

$$Li_xTi_yNi_{1-x-y}O \tag{III}$$

where x is less than or equal to about 0.3 and y is less than or equal to about 0.1.

27. The composition of claim 17, wherein the coating composition comprises ceramics, borides, carbides, silicates, chalcogenides, hydroxides, metals, metal oxides, nitrides, perovskites and perovskites derivatives, phosphides, sulfides, silicides, or a combination comprising at least one of the foregoing.

28. The composition of claim 17, wherein the polymeric material has a glass transition temperature of greater than or equal to about 150° C.

29. The composition of claim 17, wherein the polymeric material comprises a thermosetting polymer.

30. The composition of claim 17, wherein the polymeric material comprises polyetherimides, polyphenylene ethers, polyethylene terephthalates, polyimides, polyvinylidene fluorides, or a combination comprising at least one of the foregoing polymers.

31. The composition of claim 17, wherein the nanoparticle comprises a passivated metal.

32. An article comprising the composition of claim 17.

33. A method comprising:
blending a polymeric resin with nanoparticles to form a composition;
wherein the polymeric resin has a glass transition temperature greater than or equal to about 100° C.
wherein the nanoparticles comprise a substrate upon which is disposed a coating composition comprising a plurality of layers; wherein at least one layer has a dielectric constant that is different from the remaining layers; and
wherein the composition has a breakdown resistance of greater than or equal to about 200 volts/micrometer.

34. The method of claim 33, further comprising casting the composition.

35. The method of claim 33, further comprising molding the composition

36. The method of claim 35, wherein the molding comprises injection molding.

37. An article manufactured by the method of claim 33.

* * * * *

UNITED STATES PATENT AND TRADEMARK OFFICE
CERTIFICATE OF CORRECTION

PATENT NO.        : 7,465,497 B2　　　　　　　　　　　　　　　　　Page 1 of 1
APPLICATION NO. : 11/286096
DATED             : December 16, 2008
INVENTOR(S)       : Tan et al.

It is certified that error appears in the above-identified patent and that said Letters Patent is hereby corrected as shown below:

In Column 14, Line 44, in Claim 8, delete "suicides," and insert -- silicides, --, therefor.

In Column 16, Line 46, in Claim 35, after "composition" insert -- . --.

Signed and Sealed this

Seventeenth Day of March, 2009

JOHN DOLL
*Acting Director of the United States Patent and Trademark Office*